US010011697B2

(12) United States Patent
Van der Ven et al.

(10) Patent No.: US 10,011,697 B2
(45) Date of Patent: Jul. 3, 2018

(54) FOAMED FILM COMPRISING POLYETHYLENE FOAM

(71) Applicants: SAUDI BASIC INDUSTRIES CORPORATION, Riyadh (SA); SABIC GLOBAL TECHNOLOGIES B.V., Bergen op Zoom (NL)

(72) Inventors: Emanuel Joseph Herman Marie Van der Ven, Tilburg (NL); Patrick van der Meer, Spaubeek (NL); Douwe Wiebe van der Meer, Maastricht (NL); Johan Maria Krist, Kerkarade (NL); Lucio Baccaro, Maastricht (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/899,213
(22) PCT Filed: Jun. 17, 2014
(86) PCT No.: PCT/EP2014/062717
§ 371 (c)(1),
(2) Date: Dec. 17, 2015
(87) PCT Pub. No.: WO2014/202605
PCT Pub. Date: Dec. 24, 2014

(65) Prior Publication Data
US 2016/0137804 A1 May 19, 2016

(30) Foreign Application Priority Data
Jun. 20, 2013 (EP) .................................... 13173014

(51) Int. Cl.
C08J 9/12 (2006.01)
B32B 27/06 (2006.01)
(Continued)

(52) U.S. Cl.
CPC .................. *C08J 9/122* (2013.01); *B32B 5/18* (2013.01); *B32B 7/02* (2013.01); *B32B 27/065* (2013.01);
(Continued)

(58) Field of Classification Search
CPC ......... C08J 9/122; B32B 27/065; B32B 27/32
See application file for complete search history.

(56) References Cited

U.S. PATENT DOCUMENTS 4,022,858 A 5/1977 Cavanna et al.
5,432,231 A * 7/1995 Su ....................... C08L 23/0815
428/903.3
(Continued)

FOREIGN PATENT DOCUMENTS

EP 0492163 B1 7/1992
EP 1646677 B1 4/2006
(Continued)

OTHER PUBLICATIONS

"Foam Sheets of High-Pressure Polyethylene (LDPE)" (Nising and Becker; Verpackungs Rundschau 1974; pp. 948-950).
(Continued)

Primary Examiner — Hai Vo
(74) Attorney, Agent, or Firm — Cantor Colburn LLP

(57) ABSTRACT

The invention is directed to foamed film comprising a polyethylene foam obtained by physically foaming of a low density polyethylene copolymer with a density between 910 kg/m³ and 935 kg/m³ (according to ISO 1183) and a melt index between 0.10 and 100 dg/minute (according to ASTM D1133) wherein the low density polyethylene is obtained by a high pressure polymerization process of ethylene in the presence of a di- or higher functional monomer.

17 Claims, 2 Drawing Sheets

Figure 1:
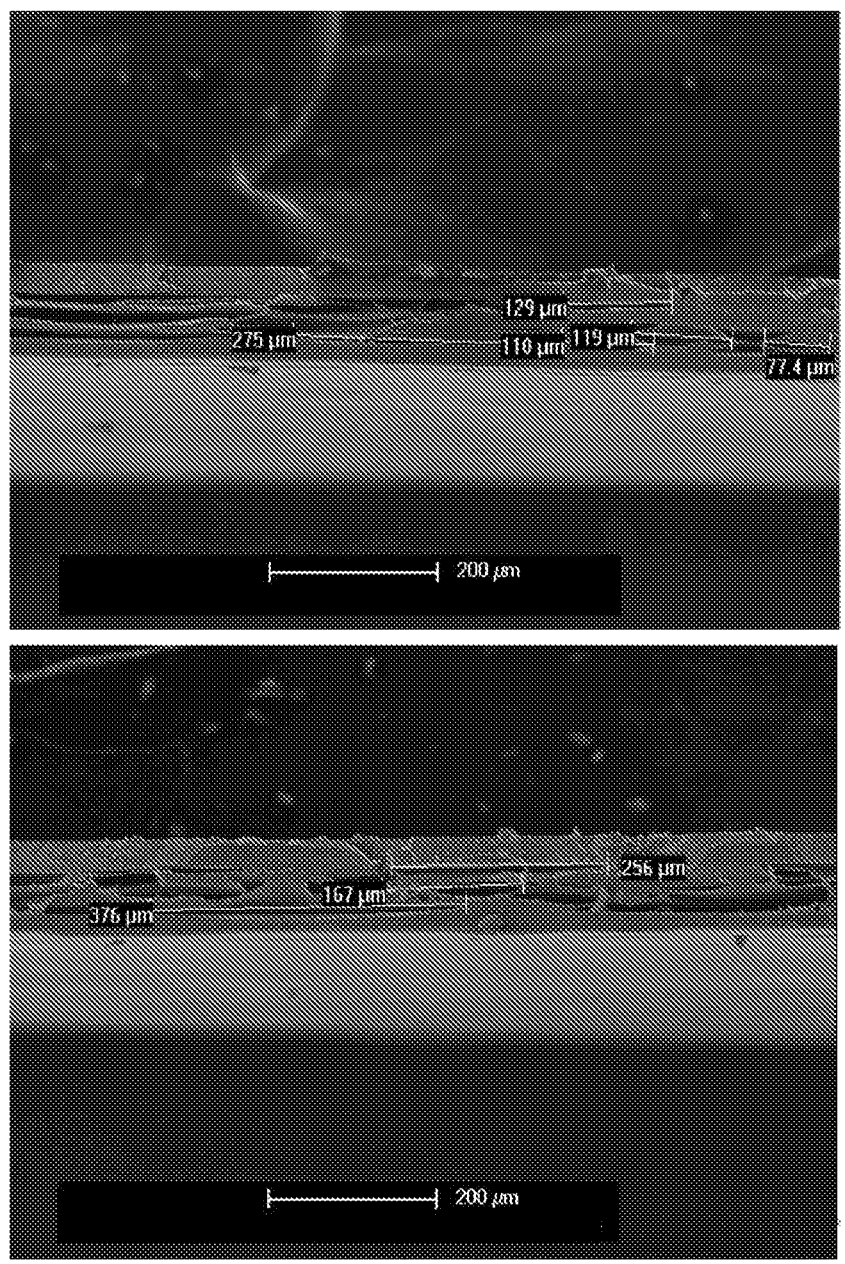

(51) Int. Cl.
| | |
|---|---|
| *B32B 27/32* | (2006.01) |
| *B32B 5/18* | (2006.01) |
| *C08J 5/18* | (2006.01) |
| *C08J 9/14* | (2006.01) |
| *B32B 7/02* | (2006.01) |

(52) U.S. Cl.
CPC .............. *B32B 27/32* (2013.01); *C08J 5/18* (2013.01); *C08J 9/14* (2013.01); *B32B 2250/03* (2013.01); *B32B 2250/242* (2013.01); *B32B 2250/40* (2013.01); *B32B 2266/025* (2013.01); *B32B 2307/72* (2013.01); *B32B 2439/00* (2013.01); *C08J 2323/08* (2013.01)

(56) References Cited

U.S. PATENT DOCUMENTS

| | | | | |
|---|---|---|---|---|
| 6,114,025 | A * | 9/2000 | DeVaudreuil | ............. B32B 5/18 |
| | | | | 264/55 |
| 2007/0260016 | A1* | 11/2007 | Best | ................... C08L 23/0815 |
| | | | | 525/240 |
| 2010/0196641 | A1* | 8/2010 | De Vos | ................. C08J 9/0061 |
| | | | | 428/36.5 |
| 2016/0177045 | A1* | 6/2016 | Krist | ........................ C08J 9/122 |
| | | | | 521/149 |

FOREIGN PATENT DOCUMENTS

| | | |
|---|---|---|
| JP | 2004161009 A | 6/2004 |
| JP | 200798578 A | 4/2007 |
| WO | 2006094723 A1 | 9/2006 |

OTHER PUBLICATIONS

International Search Report for International Application No. PCT/EP2014/062717; International Filing Date: Jul. 9, 2014; dated Jun. 17, 2014; 5 Pages.

Jan H. Schut "Foamed Films Find New Niches" Plastic Technology (Jan. 2002).

Machine Translation of JP2004161009; Date of Publication: Jun. 10, 2004; 12 Pages.

Machine Translation of JP2007098578; Date of Publication: Apr. 19, 2007; 17 Pages.

Peacock, "Handbook of Polyethylene: Structures, Properties, and Applications," Marcel Dekker, Inc. New York, 2000, pp. 43-66.

Written Opinion of the International Searching Authority for International Application No. PCT/EP2014/062717; International Filing Date: Jul. 9, 2014; dated Jun. 17, 2014; 4 Pages.

* cited by examiner

FOAMED FILM COMPRISING POLYETHYLENE FOAM

CROSS REFERENCE TO RELATED APPLICATIONS

This application is a 371 of International Application No. PCT/EP2014/062717, filed Jun. 17, 2014, which claims priority to European Application No. 13173014.5, filed Jun. 20, 2013, both of which are hereby incorporated by reference in its entirety.

The present invention relates to a foamed film comprising polyethylene foam. Foamed films comprising polyethylene foam are disclosed in "Schaumfolien aus Hochdruck Polyethylene (LDPE)" (Nising and Becker; Verpackungs Rundschau 1974; pages 948-950). Foamed films comprising polyethylene foam are also disclosed in EP1646677 B1. This patent is directed to a foamed polyolefin film of 3 to 8 mils thick having specific tear strength. EP1646677 B1 discloses the use of blends of LLDPE and low density polyethylene (LDPE) together with specific fabrication conditions to make foamed sheets of thin gauge with tear properties similar to an equivalent gauge non-foamed sheet of the same composition. Blends which combine a high melt index LLDPE rich fraction with a low melt index branched LDPE minor fraction provide the adequate balance of mechanical strength of the polymer base with its melt strength, extensibility and stress relaxation, allowing a thin foam film with tear strength which is comparable to non-foamed counterparts of similar gauge and composition.

Foamed films can be produced using cast film and sheet extrusion lines. Foamed films can also be made using the blown film co-extrusion process as disclosed in "Film Extrusion Manual" (TAPPI PRESS, 2005, ISBN 1-59510-075-X, Editor Butler, pages 413-435).

Foamed films can be produced in the form of monolayer or coextruded films with multilayers, where one or more of the layers are foamed. These thin foamed films can be further laminated to other substrates including, foil, paper, other plastics, or they can be post stretched in one or two directions for obtaining wrinkled skin surface effects. Solid polymeric films may be foamed in order to produce a similar thickness film with a lower amount of resin. Properties such as tensile strength, impact strength and elongation are related to density, and that the foaming process results in a product having less density and potential for weak failure spots. Films made from foamed polymeric material may lack adequate strength. For example LDPE resins have been used in foaming applications due to their relatively high melt strength, strain hardening behavior and easy processing.

The surface of foamed films has a large surface roughness resulting in a low gloss and a reduction of the print finish. The higher surface roughness is limiting the use in applications where a high gloss and a good print finish are needed.

It is the object of the present invention to provide a foamed film composition with an improved surface roughness.

Figure 2:
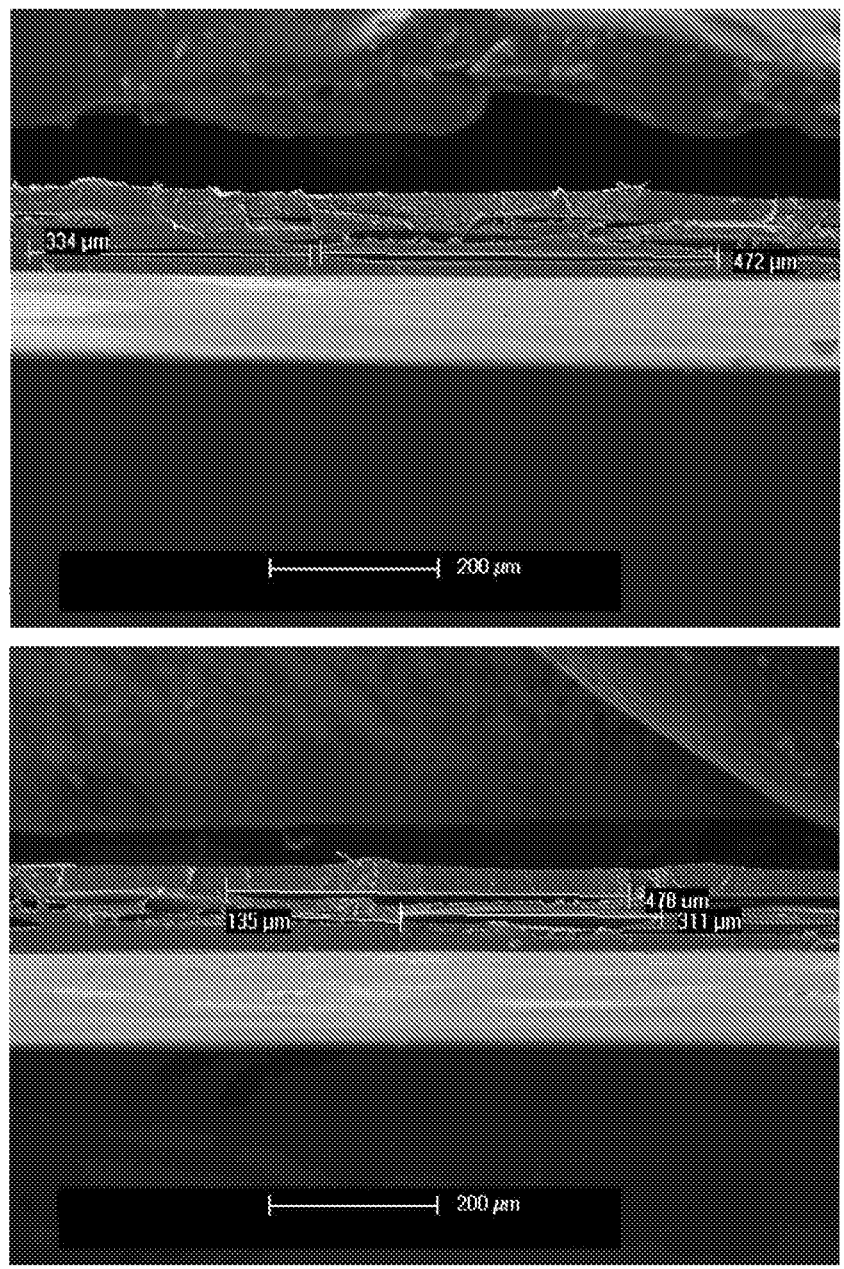

FIG. 1 are pictures of the cell structure of Example I.
FIG. 2 are pictures of the cell structure of Comparative Example A.

The invention is characterised in that the foamed film comprises at least one layer with polyethylene foam obtained by physically foaming of low density polyethylene with a density between 910 kg/m$^3$ and 935 kg/m$^3$ (according to ISO 1183) and a melt index between 0.10 and 100 dg/minute (according to ASTM D1133) and wherein the low density polyethylene is obtained by a high pressure polymerisation process of ethylene in the presence of a di- or higher functional monomer.

The foamed films according to the invention exhibit a surface structure with a low surface roughness.

It is a further advantage of the present invention that the foamed film has a smooth surface.

It is another advantage of the present invention that the foam has a fine cell structure and a homogeneous structure.

Suitable di- or higher functional monomers include 1,4-butanedioldimethacrylate (BDDMA), hexanediol dimethacrylate (HDDMA), 1,3-butylene glycoldimethacrylate (1,3-BGDMA), ethylene glycol dimethacrylate (EGDMA) and/or dodecanediol dimethacrylate (DDDMA), trimethylol propane trimethacrylate (TMPTMA), trimethacrylate ester (TMA ester) and/or bifunctional alpha,omega dienes having 6-24 carbon atoms.

According to a preferred embodiment of the invention the low density polyethylene is obtained by a high pressure polymerisation process of ethylene in the presence of 1,4-butanediol dimethacrylate as co monomer.

The high pressure polymerisation process may be an autoclave polymerisation process or a tubular polymerisation process.

According to a preferred embodiment of the invention the high pressure polymerisation process is a tubular polymerisation process.

The low density polyethylene may be obtained by a polymerisation process as disclosed in WO2006/094723.

According to a further preferred embodiment of the invention the foamed film comprises low density polyethylene foam resin based on 95.5% by weight-99.5% by weight low density polyethylene and 0.5% by weight-4.5% by weight high density polyethylene.

The foamed film may be a monolayer foamed film or a multilayer foamed film.

Preferably, the foamed film is a multilayer foamed film.
Preferably the multilayer foamed film is a three or five layer film.

A three layer film may for example comprise a foamed core layer and two solid outer layers.

A preferred polyethylene multilayer (five layers) foamed film comprises a foamed core layer, an intermediate layer located on both sides thereof and an outer layer located on both sides of the intermediate layer or the core layer.

If desired also for example seven, nine and higher amount of layer films may be applied.

If desired all layers of the multilayer film may be foamed.
According to a preferred embodiment of the invention the foamed core layer consists of LDPE as the foamed polymer.

According to a further preferred embodiment of the invention the foamed core layer comprises a blend of LDPE and LLDPE. The ratio of these polymers has to be selected such that for example the desired mechanical properties will be obtained. The weight ratio LDPE:LLDPE may range between 90:10 and 10:90. Preferably the ratio LDPE:LLDPE ranges between 20:80 and 50:50. The foamed core layer may also comprise HDPE.

According to another preferred embodiment of the invention the multilayer foamed film comprises an intermediate foamed layer comprising a blend of LDPE with LLDPE and/or HDPE and the outer layer comprising a blend of LDPE with LLDPE and/or HDPE.

The intermediate layer may comprise a blend of LDPE with LLDPE and/or HDPE. The ratio of these components has to be selected such that for example the desired mechanical properties and the process ability, for example bubble stability, will be obtained. The weight ratio LDPE: (LLDPE and HDPE) may range between 90:10 and 10:90. Preferably the ratio LDPE: (LLDPE and HDPE) ranges between 20:80 and 50:50.

The outer layer may comprise a blend of LDPE with LLDPE and/or HDPE. The ratio of these components has to be selected such that for example the desired mechanical properties, the processability, for example bubble stability and seal properties will be obtained. The weight ratio LDPE: (LLDPE and HDPE) may range between 90:10 and 10:90. Preferably the ratio LDPE: (LLDPE and HDPE) ranges between 20:80 and 50:50.

It is possible but not preferred that the core layer is not foamed and the other layers are foamed.

The polymer composition of each layer may also contain appropriate amounts of other additives such as for example fillers, antioxidants, pigments, stabilisers, antistatic agents and polymers, for example polypropylene, depending on the specific use of the multilayer film.

The total thickness of the film and the thickness of the individual layers may range between wide limits depending on the proposed intended use. The thickness of the individual layers depends amongst others of the applied extruders during the film production process.

The total thickness of the foamed film may range between for example 10 and 300 micrometers.

As an example the layer thickness ratio between the core layer and the outer layer in a three layer film ranges between 5:1 and 0.5:1.

As an example the layer thickness ratio between the core layer and the intermediate layer in a five layer film ranges between 4:1 and 0.5:1 and the layer thickness ratio between the core layer and the outer layer in a five layer film ranges between 9:1 and 0.2:1.

During the production of the foamed film the foamed layer may be obtained via a continuous extrusion process in which the blowing gas, which forms cells in the polyethylene melt or blend, is injected directly into the melt and homogeneously mixed and dissolved. In order to keep the gas dissolved in the PE melt, a minimum pressure, which is dependent on the gas used and the prevailing melt temperature, is needed in the molten polyethylene.

A process to produce foamed film is disclosed in Plastic Technology, January 2002 "Foamed Films find new niches" by Jan H. Schut and in U.S. Pat. No. 4,022,858A.

According to a preferred embodiment of the invention a nucleating agent is distributed homogeneously in the foam composition. This distribution may take place for example via a melt cooler or a static mixer.

The nucleating agent may be an organic or an inorganic nucleating agent.

Examples of suitable inorganic nucleating agents are talc, silicium oxide, titanium oxide and alumium trihydrate.

For the desired organic nucleating performance the crystallization temperature of the nucleating agent must be higher than that of polyethylene or blend of the foamed layer so that, as the polyethylene or blend cools down, the nucleating agent crystallizes sooner than polyethylene. The difference between the crystallization temperatures of polyethylene or blend and the nucleating agent may be greater than 10° C. As a result, the nucleating agent will have crystallized before the polyethylene or blend changes to the solid phase at its crystallization temperature. The crystallization temperature can be determined by DSC measurement (ASTM D3417-97).

Suitable organic nucleating agents include an amide, an amine and/or an ester of a saturated or unsaturated aliphatic $(C_{10}-C_{34})$ carboxylic acid.

Examples of suitable amides include fatty acid (bis) amides such as for example stearamide, caproamide, caprylamide, undecylamide, lauramide, myristamide, palmitamide, behenamide and arachidamide, hydroxystearamides and alkylenediyl-bis-alkanamides, preferably $(C_2-C_{32})$ alkylenediyl-bis-$(C_2-C_{32})$ alkanamides, such as for example ethylene bistearamide, butylene bistearamide, hexamethylene bistearamide, and/or ethylene bibehenamide.

Suitable amines are for instance $(C_2-C_{18})$ alkylene diamines such as for example ethylene biscaproamine and hexamethylene biscaproamine.

Suitable esters of a saturated or unsaturated aliphatic $(C_{10}-C_{34})$ carboxylic acid are the esters of an aliphatic $(C_{16}-C_{24})$ carboxylic acid.

The nucleating agent may be applied in an amount of between 0.1 and 15.0 wt. % relative to polyethylene or blend. Preferably, this amount ranges between 0.5 and 5 wt. %.

Generally the physically blown polyethylene foamed layer has a highly regular, fine cellular foam structure. The fine cellular foam may consist essentially of closed cells (with at least 90% of the cells being closed). The foam may also be partly open cell foam with an open cell content of for example 10%-90% of all cells. Generally, the polyethylene foamed layer has a density of between 10 and 850 kg/m³.

The composition of the layer to be foamed contains at least the polymer, the nucleating agent and a blowing agent. The composition may additionally contain other additives such as for example flame retardants, pigments, lubricants, antistatic agents, processing stabilizers, chemical blowing agents, cell stabiliser and/or UV stabilizers.

Suitable physical blowing agents include for example isobutane, $CO_2$, pentane, butane, nitrogen and/or fluorohydrocarbons. Preferably, the physical blowing agent is isobutane, nitrogen or $CO_2$.

Suitable cell stabilizers include for example glycerol monostearate (GMS), mixtures of GMS and glycerol monopalmitate (GMP) and/or amides such as for example stearyl stearamide and/or stearamide. Preferably, the cell stabiliser is GMS.

The multilayer films of the present invention may be prepared by any method known in the art. Multilayer structures may be prepared for example by a blown film co-extrusion process as disclosed in "Film Extrusion Manual", (TAPPI PRESS, 2005, ISBN 1-59510-075-X, Editor Butler, pages 413-435) whereas for the production of foamed film, one or more of the extruders is equipped with a gas-injection system in order to produce the foamed layer.

The production processes of LDPE, HDPE and LLDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

LDPE applied in the present film may be produced by use of autoclave high pressure technology and by tubular reactor technology.

Suitable technologies to produce LLDPE include gas-phase fluidized-bed polymerization, polymerization in solution, polymerization in a polymer melt under very high ethylene pressure, and slurry polymerization. LLDPE may be obtained with gas phase polymerisation in the presence of a Ziegler-Natta catalyst or a metallocene catalyst. The linear low density polyethylene component of the composition may be a low density polyethylene copolymer comprising ethylene and a $C_3$-$C_{10}$ alpha-olefin co monomer. Suitable alpha-olefin co monomers include butene, hexene, 4-methyl pentene and octene. Preferably, the alpha-olefin co monomer is present in an amount of about 5 to about 20 percent by weight of the ethylene-alpha olefin copolymer. Generally, the density of LLDPE is above 915 kg/m³ and ranges between 916 kg/m³ and 940 kg/m³. Generally the melt flow index (190° C./2.16 Kg) of LLDPE ranges between 0.1 and 50 g/10 min. Preferably the melt flow index of LLDPE ranges between 0.3 and 10 g/10 min.

The foamed film according to the present invention may be applied in many applications, particularly in blown-film applications including greenhouse films, consumer trash bags, grocery bags, produce bags, pallet wrap, food wrap, liners, heavy duty bags, industrial bags, consumer bags, shrink films, labels, pouches for FFS packaging, tapes, stand-up pouches, lamination films, protective films, health and hygiene film applications.

The invention will be elucidated by means of the following non-limiting examples.

EXAMPLES

Example I

Production of Foamed Film

A foamed film was produced on a 3 layers multi-layer blown-film (Collin) extruder equipped with a nitrogen gas-injection system. The film comprises a foamed core layer and two solid outer layers.

The foamed core layer comprised a blend of LDPE with LLDPE using talcum as nucleating agent (12% by weight of the total composition, NU4896PE of company TOSAF).

The weight ratio LDPE: LLDPE was 20:80.

After melting of the polymer mixture in the melting zones of the extruder, a physical blowing agent (nitrogen) is injected (0.08 g/hour). After depressurizing after the die, the material starts to foam.

The applied LDPE resin for the foamed core layer was LDPE resin I (MFI 4.7; density 919 kg/m³) obtained by high pressure tubular polymerisation process in the presence of 1,4-butanediol dimethacrylate as co monomer.

The mass temperature of extruder producing the foamed core layer was 213 degrees C. and had a mass pressure of 97 bar.

Both solid outer layers comprised a blend of LDPE with LLDPE. The weight ratio of these components was 10:90.

The above described process resulted in foamed film:
With a thickness of 100 micrometers and a specific weight of 73 g/m² (Sample I)
The thickness of the individual layers has a ratio of 1:2:1 wherein the first outer layer A has a thickness of 25 micrometers, the intermediate foamed layer B has a thickness of 50 micrometers and outer layer C has a thickness of 25 micrometers.

The foamed films were analyzed via microscopy:
Scanning electron microscopy (SEM) to investigate cell structure
Surface optical microscopy to validate the surface of the foam using image analysis AnalySIS auto from Olympus Description of Analysis of Foamed Seals The samples for cross section analysis were cut out of the sheet (parallel to the length direction) using a razor blade, and fixed into a SEM sample holder.

The samples for surface analysis were also cut out of the sheet and fixed with double sided adhesive tape to a SEM sample holder. All samples were coated with a conductive gold layer (150 s, 30 mA). Imaging of the cross sections is done using a Philips CP SEM XL 30 at an acceleration voltage of 15 kV.

The samples for surface analysis were imaged with LM (reflected bright light) Leica MZFLIII.

The image analysis is done using AnalySIS auto from Olympus. For each image a number of steps (in various combinations) have been taken to enhance the desired features:
Resulting image contrast optimized and binarized.
Features are analysed and put in Excel files.
Conversion from 2D to 3D using Matlab tool.

Comparative Example A

Example I was repeated with the exception that LDPE homopolymer with MFI 7.5 and density 924 kg/m³ was applied.

The above described process resulted in foamed film:
With a thickness of 100 micrometers and a specific weight of 73 g/m²
The thickness of the individual layers has a ratio of 1:2:1 wherein layer A has a thickness of 25 micrometers, foamed layer B has a thickness of 50 micrometers and layer C has a thickness of 25 micrometers.

Pictures of the cell structure of Example I are listed as FIG. 1 and pictures of the cell structure of Comparative Example A are listed as FIG. 2.

Table 1 contains the result of the digital analysis of the cell structure of the product of Example I and Comparative Example A.

FIG. 1 and FIG. 2:

| Cell size measurement | FIG. 2 (micrometers) | FIG. 2 (micrometers) |
| --- | --- | --- |
| 1 | 275 | 334 |
| 2 | 129 | 472 |
| 3 | 110 | 135 |
| 4 | 119 | 478 |
| 5 | 77.4 | 311 |
| 6 | 376 | — |
| 7 | 167 | — |
| 8 | 256 | — |
| Average | 189 | 346 |

The average cell size of foamed film Example 1 is smaller as the average cell size of foamed film of the comparative example. The smaller cell structure results in an improved oxygen permeation and improved surface structure.

The invention claimed is:

1. A multilayer film comprising: a polyethylene foamed core layer comprising a blend of low density polyethylene (LDPE), linear low density polyethylene (LLDPE), and high density polyethylene (HDPE), wherein a weight ratio of LDPE to LLDPE is from 10:90 to 50:50, wherein the LDPE has a density from 910 kg/m$^3$ to 935 kg/m$^3$ (according to ISO 1183) and a melt index from 0.10 to 100 dg/minute (according to ASTM D1133), wherein the LDPE is obtained by a high pressure polymerization process of ethylene in the presence of a di- or higher functional monomer; and wherein the HDPE is present in an amount of from 0.5% by weight to 4.5% by weight relative to the total amount of LDPE, LLDPE and HDPE.

2. The multilayer film according to claim 1, wherein the LDPE is obtained by a high pressure polymerization process of ethylene in the presence of 1,4-butanediol dimethacrylate as co-monomer.

3. The multilayer film according to claim 1, wherein the high pressure polymerisation process is a tubular polymerisation process.

4. The multilayer film according to claim 1 wherein the multilayer film comprises the foamed core layer, an intermediate layer located on both sides thereof and an outer layer located on both sides of the intermediate layer or the foamed core layer.

5. The multilayer film according to claim 4 wherein the intermediate layer comprises a blend of LDPE with LLDPE and/or HDPE and wherein the outer layer comprises a blend of LDPE with LLDPE and/or HDPE.

6. The multilayer film according to claim 4, wherein a layer thickness ratio of the foamed core layer and the intermediate layer is in the range of 4:1 to 0.5:1.

7. The multilayer film according to claim 4, wherein a layer thickness ratio of the foamed core layer and the outer layer is in the range of 9:1 to 0.2:1.

8. An article prepared using the multilayer film according to claim 1.

9. The article of claim 8, wherein the article is at least one of greenhouse film, consumer trash bag, grocery bag, produce bag, pallet wrap, food wrap, liner, heavy duty bag, industrial bag, consumer bag, shrink film, label, pouch, tape, stand-up pouches, lamination film, protective film, health and hygiene film.

10. The multilayer film according to claim 1, wherein the multilayer film comprises a three layer film comprising the foamed core layer and an outer layer located on both sides of the foamed core layer, and wherein a layer thickness ratio of the foamed core layer and the outer layer is in the range of 5:1 to 0.5:1.

11. The multilayer film according to claim 1, further comprising a nucleating agent in an amount in the range of 0.1 to 15.0 wt. % relative to the blend.

12. The multilayer film according to claim 11, wherein the nucleating agent is an inorganic nucleating agent comprising talc, silicon oxide, titanium oxide, or aluminum oxide.

13. The multilayer film according to claim 11, wherein the nucleating agent is an organic nucleating agent comprising an amide, an amine, or an ester of a saturated or unsaturated aliphatic carboxylic acid.

14. The multilayer film according to claim 1, wherein the LLDPE comprises ethylene and a $C_3$-$C_{10}$ alpha-olefin co-monomer.

15. The multilayer film according to claim 14, wherein the $C_3$-$C_{10}$ alpha-olefin co-monomer comprises butane, hexane, 4-methyl pentene, or octane.

16. The multilayer film according to claim 14, wherein the $C_3$-$C_{10}$ alpha-olefin co-monomer is present in an amount of from 5 to 20% by weight of the LLDPE.

17. The multilayer film according to claim 1, wherein the weight ratio of LDPE to LLDPE is 20:80 to 50:50.

* * * * *